(12) United States Patent
Marwah et al.

(10) Patent No.: US 10,318,493 B2
(45) Date of Patent: *Jun. 11, 2019

(54) CUSTOM POLICY DRIVEN DATA PLACEMENT AND INFORMATION LIFECYCLE MANAGEMENT

(71) Applicant: Oracle International Corporation, Redwood Shores, CA (US)

(72) Inventors: Vineet Marwah, San Ramon, CA (US); Hariharan Lakshmanan, Belmont, CA (US); Ajit Mylavarapu, Mountain View, CA (US); Prashant Gaharwar, San Carlos, CA (US); Amit Ganesh, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/804,581

(22) Filed: Mar. 14, 2013

(65) Prior Publication Data
US 2014/0095450 A1   Apr. 3, 2014

Related U.S. Application Data

(60) Provisional application No. 61/707,685, filed on Sep. 28, 2012.

(51) Int. Cl.
G06F 17/30 (2006.01)
G06F 3/06 (2006.01)
(Continued)

(52) U.S. Cl.
CPC .......... G06F 16/185 (2019.01); G06F 3/0649 (2013.01); G06F 16/113 (2019.01);
(Continued)

(58) Field of Classification Search
USPC ......................................................... 707/668
See application file for complete search history.

(56) References Cited

U.S. PATENT DOCUMENTS

| | | |
|---|---|---|
| 5,680,573 A | 10/1997 | Rubin |
| 5,933,838 A | 8/1999 | Lomet |

(Continued)

FOREIGN PATENT DOCUMENTS

WO    WO 01/82118 A2    11/2001

OTHER PUBLICATIONS

Lambert, Bob, "DMBI Tech Tip: Include Audit Columns on all Tables", CapTech Venrures, dated Jan. 12, 2011, 2 pages.

(Continued)

*Primary Examiner* — Tuan A Pham
*Assistant Examiner* — Muluemebet Gurmu
(74) *Attorney, Agent, or Firm* — Hickman Palermo Becker Bingham LLP (57) ABSTRACT

A method, apparatus, and system for custom policy driven data placement and information lifecycle management in a database management system are provided. A user or database application can specify declarative custom policies that define the movement and transformation of stored database objects. A custom policy defines, for a database object, a custom function to evaluate on an associated database object to determine whether an archiving action is triggered. Archiving actions may include compression, data movement, table clustering, and other actions to place the database object into an appropriate storage tier for a lifecycle phase of the database object. The custom function is defined by the database user, and can flexibly include any customized business logic using data sources internal and external to the database, including database access statistics such as segment level or block level heatmaps.

19 Claims, 5 Drawing Sheets

(51) Int. Cl.
- *G06F 16/185* (2019.01)
- *G06F 16/21* (2019.01)
- *G06F 16/22* (2019.01)
- *G06F 16/27* (2019.01)
- *G06F 16/11* (2019.01)

(52) U.S. Cl.
CPC ............ *G06F 16/21* (2019.01); *G06F 16/217* (2019.01); *G06F 16/22* (2019.01); *G06F 16/27* (2019.01)

(56) References Cited

U.S. PATENT DOCUMENTS

| | | |
|---|---|---|
| 7,251,669 B1 | 7/2007 | Arora et al. |
| 7,328,192 B1 | 2/2008 | Stengard et al. |
| 8,316,051 B1 | 11/2012 | Burns |
| 8,346,747 B2 | 1/2013 | Liu et al. |
| 8,547,379 B2 | 10/2013 | Pacheco |
| 8,688,654 B2 | 4/2014 | Groseclose |
| 8,994,755 B2 | 3/2015 | Robinson |
| 2003/0055807 A1 | 3/2003 | Lomet |
| 2003/0101133 A1* | 5/2003 | DeFrancesco, Jr. ... G06Q 10/10 705/38 |
| 2003/0105732 A1 | 6/2003 | Kagalwala et al. |
| 2003/0236781 A1* | 12/2003 | Lei .................... G06F 17/30471 |
| 2004/0098383 A1* | 5/2004 | Tabellion et al. ................. 707/3 |
| 2004/0117407 A1* | 6/2004 | Kumar et al. ................ 707/200 |
| 2005/0027749 A1 | 2/2005 | Ohno |
| 2005/0149584 A1 | 7/2005 | Bourbonnais et al. |
| 2005/0256897 A1 | 11/2005 | Sinha |
| 2006/0085485 A1 | 4/2006 | Shimshoni |
| 2006/0101052 A1 | 5/2006 | Netrakanti |
| 2006/0218127 A1* | 9/2006 | Tate et al. ......................... 707/3 |
| 2007/0088912 A1 | 4/2007 | Mukherjee |
| 2007/0156790 A1 | 7/2007 | Sun Hsu et al. |
| 2007/0198552 A1 | 8/2007 | Farrand |
| 2007/0208665 A1* | 9/2007 | Ohara ............................. 705/51 |
| 2008/0040505 A1* | 2/2008 | Britto et al. .................. 709/238 |
| 2008/0098045 A1 | 4/2008 | Radhakrishnan et al. |
| 2008/0235183 A1 | 9/2008 | Draese et al. |
| 2008/0250073 A1 | 10/2008 | Nori et al. |
| 2008/0294697 A1 | 11/2008 | Andrasak et al. |
| 2009/0070382 A1 | 3/2009 | Agrawal et al. |
| 2009/0177622 A1 | 7/2009 | Hu et al. |
| 2009/0187544 A1 | 7/2009 | Hsu et al. |
| 2009/0198729 A1 | 8/2009 | Gong |
| 2010/0077168 A1 | 3/2010 | Arakawa |
| 2010/0274827 A1 | 10/2010 | Hix et al. |
| 2010/0287178 A1 | 11/2010 | Lambert |
| 2011/0106863 A1 | 5/2011 | Mamidi |
| 2011/0179066 A1 | 7/2011 | Cardno |
| 2011/0282830 A1 | 11/2011 | Malige |
| 2012/0011329 A1 | 1/2012 | Nonaka |
| 2012/0030247 A1 | 2/2012 | Yambal et al. |
| 2012/0042130 A1 | 2/2012 | Peapell |
| 2012/0137059 A1* | 5/2012 | Yang et al. ................... 711/104 |
| 2012/0137061 A1 | 5/2012 | Yang |
| 2012/0144098 A1 | 6/2012 | Yang |
| 2012/0144099 A1 | 6/2012 | Yang |
| 2012/0173477 A1 | 7/2012 | Coutts |
| 2012/0185648 A1 | 7/2012 | Benhase |
| 2012/0233129 A1* | 9/2012 | Brinkmoeller ...... G06F 21/6254 707/662 |
| 2012/0260040 A1 | 10/2012 | Mallge |
| 2013/0155118 A1 | 6/2013 | Robinson |
| 2013/0169666 A1 | 7/2013 | Pacheco |
| 2013/0169966 A1 | 7/2013 | Pacheco |
| 2013/0325326 A1 | 12/2013 | Blumenberg |
| 2014/0033120 A1 | 1/2014 | Bental |
| 2014/0095438 A1 | 4/2014 | Marwah et al. |
| 2014/0095442 A1 | 4/2014 | Guo et al. |
| 2014/0095448 A1 | 4/2014 | Marwah et al. |
| 2014/0095449 A1 | 4/2014 | Marwah et al. |
| 2014/0122778 A1 | 5/2014 | O'Brien |
| 2014/0244623 A1 | 8/2014 | King |
| 2015/0170382 A1 | 6/2015 | Bhatia |

OTHER PUBLICATIONS

Ahmed et al., "Lifecycle Management of Relational Records for External Auditing and Regulatory Compliance", IEEE, dated 2011.

U.S. Appl. No. 13/826,075, filed Mar. 14, 2013, Final Office Action, dated Feb. 2, 2015.

Verma et al., "An Architecture for Lifecycle Management in Very Large File Systems", Mass Storage Systems and Technologies, dated 2005, IEEE, 9 pages.

Chen et al., "Information Valuation for Information Lifecycle Management", Autonomic Computing, dated 2005, 12 pages.

Lambert, Bob, "DMBI Tech Tip: Include Audit Columns on all Tables Cap Tech Consulting", dated Jan. 12, 2011, 2 pages.

U.S. Appl. No. 13/826,075, filed Mar. 14, 2013, Office Action, dated Oct. 1, 2014.

U.S. Appl. No. 13/804,394, filed Mar. 14, 2013, Office Action, dated Oct. 22, 2014.

U.S. Appl. No. 13/826,075, filed Mar. 14, 2013, Office Action, dated Aug. 13, 2015.

U.S. Appl. No. 13/804,394, filed Mar. 14, 2013, Office Action, dated Jun. 22, 2015.

U.S. Appl. No. 13/826,075, filed Mar. 14, 2013, Office Action, dated Feb. 26, 2016.

U.S. Appl. No. 13/826,075, filed Mar. 14, 2013, Interview Summary, dated Nov. 18, 2015.

U.S. Appl. No. 13/804,394, filed Mar. 14, 2013, Interview Summary, dated Nov. 16, 2015.

U.S. Appl. No. 13/750,865, filed Jan. 25, 2013, Final Office Action, dated Nov. 4, 2015.

Chi, Ed Huai-Hsin, "A Framework for Information Visualization Spreadsheets", PhD diss., University of Minnesota, dated 1999, 160 pages.

Chi et al., "Principles for Information Visualization Spreadsheets", IEEE, Computer Graphics and Applications 4, dated 1998, 9 pages.

U.S. Appl. No. 13/804,394, filed Mar. 14, 2013, Final Office Action, dated Feb. 10, 2016.

U.S. Appl. No. 13/804,884, filed Mar. 14, 2013, Office Action, dated Dec. 18, 2015.

U.S. Appl. No. 13/826,075, filed Mar. 14, 2013, Final Office Action, dated Jul. 5, 2016.

U.S. Appl. No. 13/804,884, filed Mar. 14, 2013, Advisory Action, dated Jun. 29, 2016.

Marwah, U.S. Appl. No. 13/826,075, filed Mar. 14, 2013, Office Action, dated Dec. 5, 2016.

Marwah, U.S. Appl. No. 13/826,075, filed Mar. 14, 2013, Interview Summary, dated Mar. 6, 2017.

Marwah, U.S. Appl. No. 13/804,884, filed Mar. 14, 2013, Final Office Action, dated Apr. 17, 2017.

U.S. Appl. No. 13/804,884, filed Mar. 14, 2013, Final Office Action, dated Apr. 28, 2016.

U.S. Appl. No. 13/750,873, filed Jan. 25, 2013, Final Office Action, dated Jun. 2, 2016.

Ren et al., "A New Buffer Cache Design Exploiting Both Temporal and Content Localities", IEEE, dated 2010, 11 pages.

Guo, U.S. Appl. No. 13/750,865, filed Jan. 25, 2013, Advisory Action, dated Dec. 6, 2017.

Marwah, U.S. Appl. No. 13/804,394, filed Mar. 14, 2013, Final Office Action, dated Feb. 26, 2018.

Marwah, U.S. Appl. No. 13/804,884, filed Mar. 14, 2013, Office Action, dated Sep. 19, 2018.

Guo, U.S. Appl. No. 13/750,873, filed Jan. 25, 2013, Office Action, dated Oct. 18, 2018.

Marwah, U.S. Appl. No. 13/804,394, filed Mar. 14, 2013, Office Action, dated Jun. 1, 2018.

Marwah, U.S. Appl. No. 13/804,394, filed Mar. 14, 2013, Advisory Action, dated May 10, 2018.

Marwah, U.S. Appl. No. 13/804,884, filed Mar. 14, 2013, Advisory Action, dated Jul. 5, 2018.

(56) References Cited

OTHER PUBLICATIONS

Guo, U.S. Appl. No. 13/750,865, filed Jan. 25, 2013, Notice of Allowance, dated Aug. 10, 2018.
Marwah, U.S. Appl. No. 13/804,394, filed Mar. 14, 2013, Final Office Action dated Dec. 5, 2018.
Marwah, U.S. Appl. No. 13/804,884, filed Mar. 14, 2013, Interview Summary dated Dec. 18, 2018.

* cited by examiner

POLICY CREATION STATEMENT 150

{OBJECT}
 ILM ADD {POLICY |
 POLICY_NAME}
 {ACTION}
 {SCOPE}
 {CONDITION}

POLICY MANAGEMENT STATEMENT 151

{OBJECT} ILM {DELETE [ALL] |
            ENABLE [ALL] |
            DISABLE [ALL] }
 POLICY [POLICY_NAME]

OBJECT CLAUSE 152A

CREATE TABLE TableName |
ALTER TABLE TableName |
ALTER TABLE TableName MODIFY PARTITION PartitionName

ACTION CLAUSE 152B

COMPRESS FOR CompLevel |
TIER TO Tablespace_Name [READ ONLY]
CLUSTERING CLUSTER BY Cluster (Cluster Key list)
INDEXING OFF

SCOPE CLAUSE 152C

SEGMENT

CONDITION CLAUSE 152D

ON CustomFunction

CUSTOM FUNCTION CREATION STATEMENT 153

CREATE OR REPLACE FUNCTION CustomFunction (objn IN NUMBER)
 (user defined logic)
RETURN BOOLEAN

202
Receive a policy to associate with a database object in a database, the policy specifying a custom function, defined by a user of the database, for triggering an archiving action on a stored representation of the database object, wherein a database management system registers the custom function in the database in response to receiving user input from the user requesting to register the custom function

204
Evaluating the custom function to a particular result

206
In response to evaluating the custom function to the particular result, the database management system performing the archiving action on the stored representation of the database object

FIG. 3

CUSTOM POLICY DRIVEN DATA PLACEMENT AND INFORMATION LIFECYCLE MANAGEMENT

CROSS-REFERENCE TO RELATED APPLICATIONS; BENEFIT CLAIM

This application claims the benefit of U.S. Provisional Application No. 61/707,685, filed Sep. 28, 2012, which is hereby incorporated by reference in its entirety. This application is related to "Tracking Row and Object Database Activity into Block Level Heatmaps", U.S. patent application Ser. No. 13/804,884 filed Mar. 14, 2013; "Policy Driven Data Placement and Information Lifecycle Management", U.S. patent application Ser. No. 13/804,394 filed Mar. 15, 2013; "Techniques for Activity Tracking, Data Classification, and In Database Archiving", U.S. patent application Ser. No. 13/750,873 filed Jan. 25, 2013; and "Techniques for Lifecycle State Management and In-Database Archiving", U.S. patent application Ser. No. 13/750,865 filed Jan. 25, 2013; the entire contents of these patents are hereby incorporated by reference as if fully set forth herein.

FIELD OF THE INVENTION

The present disclosure relates to databases, and more specifically, to custom policy driven data placement and information lifecycle management.

BACKGROUND

Data is generated and stored at ever increasing rates in organizations both governmental and corporate. While some business data almost never loses its value, the usefulness of most data tends to decline over time until it has no further value for almost any purpose. Generally, the value of business information tends to be the greatest soon after the data is created and remains active for only a short period of time, at most a few years, after which the data's importance to the business, and thus the data's general usage, begins to decline. However, many businesses are constrained by factors, such as legal mandates, requiring data to be retained long after the data's usefulness has expired.

As a result, it has been commonly observed that users access at times as little as 10%-20% of the data stored within a database. The other 80-90% of data is rarely, if ever, accessed by users and yet contributes to the bulk of the storage costs required to maintain the database. To make matters worse, as the volume of data stored by the database increases, performance becomes degraded due to slower full table scans and elongated application upgrades.

Thus, faced with rising storage costs and deteriorating system performance, businesses have sought ways to efficiently manage their database's inactive data. At present, many businesses try to achieve this goal by resorting to third party archiving solutions that offload inactive data out of the database and into archival storage. While these solutions help to ameliorate the effects of accelerated data production, businesses employing third party archiving solutions tend to replace one problem with a host of others.

As one issue, third party archiving solutions tend to lack intimate knowledge of the format and contents of the database. For instance, many third party archiving solutions only work at the level of the file system and therefore can only archive at the granularity of a file. Thus, while a third party archiving solution may be able to offload the individual files that make up the database, the third party archiving solution may not be able to selectively offload individual database elements.

Furthermore, the third party archiving solution may detect inactive data based on file level metrics, such as the frequency or recency with which files are accessed, but may be unable to detect inactivity at the granularity of an individual database element. Consequently, when a database file contains both active and inactive data, third party archiving solutions may be unable to identify and archive only the inactive data. This issue can be exacerbated by database implementations that store data as flat files, where an entire table, or even the entire database, may be contained within a single large file on the file system.

To work around the inability of third party archiving solutions to separate inactive data beyond the granularity of a file, a database administrator may instead manually separate active and inactive data objects into different database files. For example, the database administrator may explicitly move inactive data objects to a separate tablespace, which can then be offloaded to archival storage. However, this workaround introduces heavy database administration burdens, as implementing and validating the required application schema modifications is not a trivial task. For example, the database administrator may be required to discern data access patterns from redo logs and develop customized scripts to separate the inactive data. Moreover, an offline database maintenance window is usually reserved to execute the schema modifications, negatively impacting database availability.

Based on the foregoing, there is a need for an efficient way of organizing inactive data in a database while simplifying database management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database management system ("DBMS") provides custom policy driven data placement and information lifecycle management. The term information lifecycle management refers to the effective management of information, such as database rows or records, throughout the various lifecycle phases of its useful life, from high relevance phases to low relevance phases, from creation to disposal. To implement information lifecycle management in a DBMS, a user or database application can specify declarative custom policies that define the movement and transformation of stored database objects into storage tiers according to various custom conditions. The policies are associated with a database object and may also be inherited from policies on parent database objects.

A custom policy defines, for a database object, a custom function to evaluate on an associated database object to determine whether an archiving action is triggered. The custom function is user-defined and registered into a database, and can flexibly include any customized logic using data information sources internal and external to the database, including database access statistics such as block level heatmaps, segment level heatmaps, and higher level heatmaps, as more fully described in the patent titled "Tracking Row and Object Database Activity into Block Level Heatmaps". The access statistics may be exposed via an application programming interface (API).

Archiving actions may include compression, data movement, table clustering, and other actions to place the database object in an appropriate storage tier for a lifecycle phase of the database object, where a storage tier may represent a type of storage medium and/or the technique used to compress or store the data on the storage medium, as defined further in Database Systems below.

The policies may be evaluated on an adjustable periodic basis. A task is queued to execute an associated archiving action for each evaluated custom policy that results in a TRUE value for the custom function. The queue of tasks may be processed by a resource aware task scheduler, allowing the tasks to be carried out automatically in the background with minimal overhead and database performance impact. Thus, custom policies may be used to defer compression and other high overhead actions to the background.

Since custom policy evaluation occurs in the background without any user intervention, management and administration tasks are limited to an initial definition of the custom policies and custom functions. By defining policies on a table and utilizing policy inheritance, the policies can also be automatically associated with future table partitions without any user intervention. As the custom functions can integrate any business logic as desired by the database user, policies can be tailored according to specific business needs and can integrate logic and data information sources external to the database. Accordingly, a database management system can implement custom policy driven data movement and information lifecycle management in a flexible manner while providing high performance and low maintenance.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A database object such as a tablespace or a segment may be assigned to a particular storage tier. A storage tier denotes a particular balance between access speed and storage cost. Each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of a DBMS, data with higher operational relevance can be placed on faster storage mediums, such as top-quality disk drives, while data with lesser operational relevance can be placed on slower storage mediums, such as optical disks or tape drives.

Each storage tier may also represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of a database management system, data with higher operational relevance can be stored uncompressed to allow faster access, while data with lower operational relevance can be compressed to save space. Storage tiers may represent a combination of both storage medium and the technique used to compress or store data on the storage medium.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

Figure 1A:
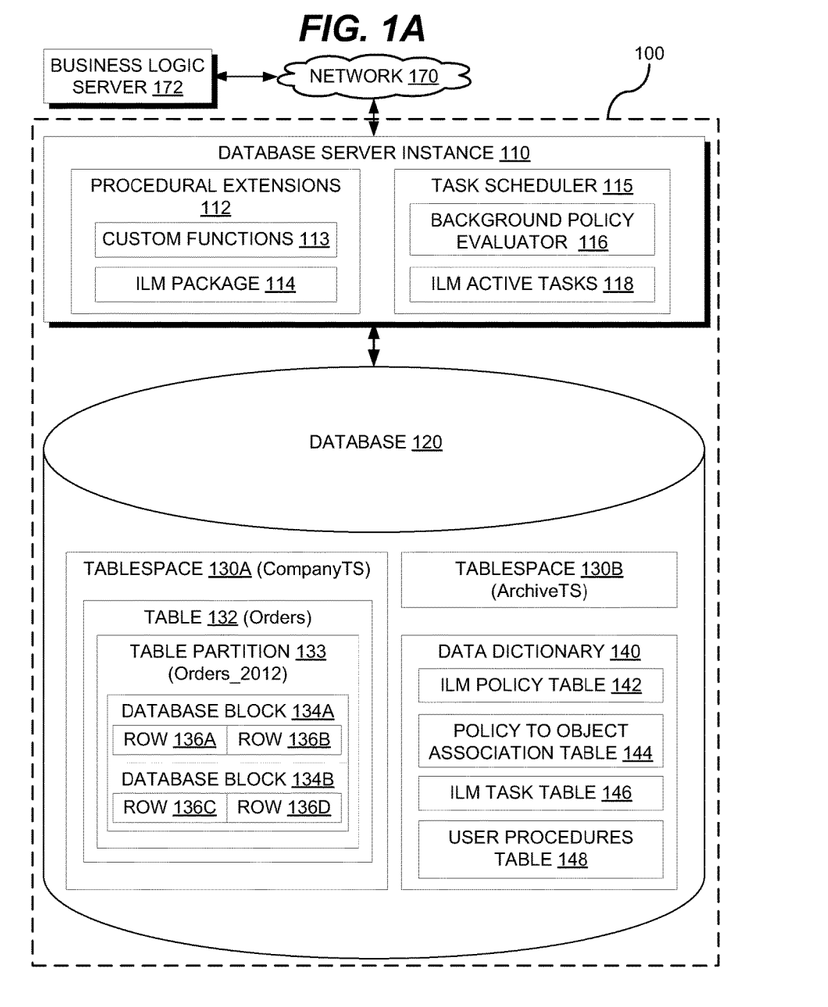
FIG. 1A is a block diagram that depicts an example database management system for custom policy driven data movement and information lifecycle management, according to an embodiment.

FIG. 1A is a block diagram that depicts an example database management system 100 for policy driven data movement and information lifecycle management, according to an embodiment. FIG. 1A includes database management system 100, network 170, and business logic server 172. Database management system 100 includes database server instance 110 and database 120. Database server instance 110 includes procedural extensions 112 and task scheduler 115. Procedural extensions 112 include custom functions 113 and information lifecycle management (ILM) package 114. Task scheduler 115 includes background policy evaluator 116 and ILM active tasks 118. Database 120 includes tablespace 130A, tablespace 130B, and data dictionary 140. Tablespace 130A includes table 132. Table 132 includes table partition 133. Table partition 133 includes database block 134A and database block 134B. Database block 134A includes row 136A and row 136B. Database block 134B includes row 136C and row 136D. Data dictionary 140 includes ILM policy table 142, policy to object association table 144, ILM task table 146, and user procedures table 148.

While database management system 100 only shows a single database server instance 110, embodiments may include multiple database server instances supported by one or more nodes. Thus, database management system 100 may be a multi-node database system. Further, while database 120 is shown as stored on a single storage element, database 120 may be supported by any type of underlying storage volume such as tiered storage and disk arrays across multiple local and/or networked physical disks. For example, tablespace 130A may be stored on a high cost, high performance array of solid state disks, whereas tablespace 130B may be stored on a low cost array of hard disk drives. The storage volumes may be interfaced using an automatic storage manager, a logical volume manager, a clustered file system, or another storage layer.

Database server instance 110 is a server instance of database 120. Custom ILM policies for database 120 can be defined through the use of new custom ILM policy clauses in database commands issued to database server instance 110. Database server instance 110 may also support procedural commands via procedural extensions 112, for example by supporting Procedural Language/Structured Query Language (PL/SQL). Accordingly, ILM package 114 may also be provided as a PL/SQL package, allowing database users and applications to perform advanced management and customization of ILM policies.

Custom functions 113 may include user-defined custom functions implementing customized logic for use with custom ILM policies, and may be written as procedural functions in any language supported by database 120, including PL/SQL and Java. Custom functions 113 may be previously registered into database 120, stored as metadata within user procedures table 148.

The customized logic of custom functions 113 may optionally utilize internal database access statistics, such as segment or block level heatmaps, to access a variety of useful information for database objects including a last access time, a last modified time, and a creation time, which can be used to derive a minimum period of read inactivity, a minimum period of write inactivity, or a length of time since the creation time. The access statistics may not be directly exposed and may instead be externalized and exposed to custom functions 113 via an application programming interface (API), as described in greater detail below under the Heatmap Statistics API heading.

In some embodiments, custom functions 113 may access data information sources outside of database management system 100, for example by accessing data from business logic server 172 over network 170, which may comprise a network such as the Internet or a local intranet. Business logic server 172 may be an internal server providing in-house logic and services, or a public server providing public and third-party logic and services.

Once a custom policy clause is received by database server instance 110, it may be parsed and stored within ILM policy table 142 of data dictionary 140. The custom policy may be associated with specific database objects in policy to object association table 144. Since policies can be inherited from parent objects, policy to object association table 144 may map a policy to various database objects at different scopes within database 120. For example, a policy specified on table 132 may be associated with table 132 at the table scope, and with table partition 133 at the table partition scope. Furthermore, any new or future table partitions created in table 132 will also inherit the policy specified on table 132.

Task scheduler 115 may be a multi-instance aware task scheduler that can schedule and delegate tasks to database instances. On a customizable periodic schedule, background policy evaluator 116 may evaluate each custom policy in ILM policy table 142. If a specified function called in custom functions 113 returns a TRUE condition with respect to a mapping in policy to object association table 144, then a task may be generated for that mapping, with the task queued into ILM task table 146. Custom functions that can return TRUE only once for a particular database object may be disabled after triggering to reduce future parsing time.

Task scheduler 115 may operate in the background, consuming the queue in ILM task table 146 to delegate tasks to database instances according to available resources, such as memory and processor cycles. Thus, tasks from ILM task table 146 may be loaded into ILM active tasks 118 for execution by database server instance 110, which may occur while database 120 is online. Ongoing status of running ILM tasks and results of finished or failed ILM tasks may also be maintained within ILM task table 146. Data structures of database management system 100 such as redo and undo records may be utilized to roll back, recover, and retry failed ILM tasks.

Heatmap Statistics API

An API may be provided that externalizes heatmap statistics for database objects at various scopes. The API may be implemented using a PL/SQL package of PL/SQL functions, by using defined database views, or by other interfaces. The functions within the API can then be used within custom functions 113 to implement any customized logic as desired by the database user. The use of these API functions is optional and the customized logic can be completely independent of the API functions. An example heatmap statistics API is described below as a PL/SQL package "dbms_heat_map".

A function BLOCK_HEAT_MAP of dbms_heat_map may accept a table segment as an input and return block level heatmap records, including modified times for each database block in the table segment. The modified times may include a maximum or latest modified time. Each record may also include other identifying data such as the associated database block number and file number. Optionally, a sort column and a sort order may be specified to order the returned records.

A function EXTENT_HEAT_MAP of dbms_heat_map may accept a table segment as an input and return extent level heatmap information, including one or more last modified times for each extent in the table segment, which are derived from aggregate statistics on the database blocks in each extent. The one or more last modified times may include a minimum, maximum, and average.

A function SEGMENT_HEAT_MAP of dbms_heat_map may accept a segment as an input and return segment level heatmap information, including one or more access times for the segment. The one or more access times may include read times, write times, full text search times, and lookup times, and each access time may include a minimum, maximum, and average. If a particular type of access is not applicable to the segment or has never occurred, then a zero, null, or other preset value may be provided.

A function OBJECT_HEAT_MAP of dbms_heat_map may accept a table object and return object level heatmap information, including access times for all segments belonging to the table object. For example, the table object may be a table having several table partitions in different segments. For each segment in the table object, the OBJECT_HEAT_MAP function may return segment level heatmap information substantially similar to that provided by the SEGMENT_HEAT_MAP function.

A function TABLESPACE_HEAT_MAP of dbms_heat_map may accept a tablespace and return tablespace level heatmap information, including one or more access times for the tablespace, which are derived from aggregate statistics on the segments within the tablespace. The one or more access times may include read times, write times, full text search times, and lookup times, and each access time may include a minimum, maximum, and average. If a particular type of access is not applicable to the segment or has never occurred, then a zero, null, or other preset value may be provided. Further, a total segment count and allocated byte size may be returned.

Besides functions in dbms_heat_map, defined database views can also be provided to expose the heatmap information. For example, a defined view DBA_HEAT_MAP_SEGMENT may provide substantially the same information as the SEGMENT_HEAT_MAP function, and a defined view DBA_HEAT_MAP_SEG_HISTOGRAM may provide a summary access histogram over time for a particular segment.

Process Overview

Figure 2:
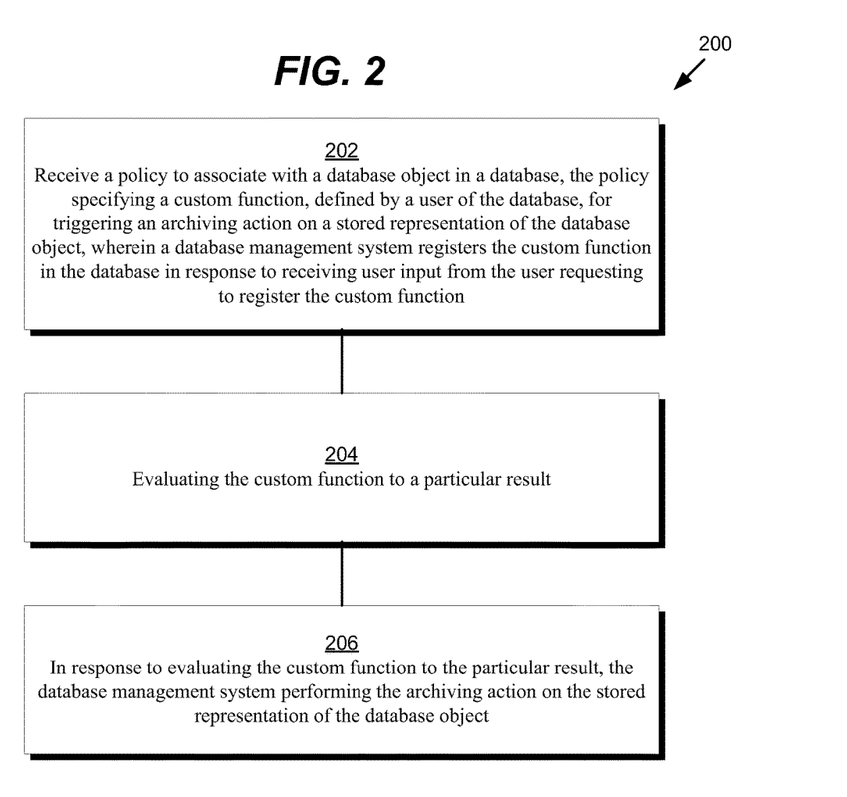
FIG. 2 is a flow diagram that depicts a process for custom policy driven data movement and information lifecycle management, according to an embodiment.

With a basic outline of database management system 100 now in place, it may be instructive to review a high level overview of the processing steps to define and carry out a custom ILM policy. Turning to FIG. 2, FIG. 2 is a flow diagram that depicts a process 200 for custom policy driven data movement and information lifecycle management, according to an embodiment.

Receiving a Declarative Custom Policy Statement

At block 202 of process 200, referring to FIG. 1A, database server instance 110 receives a policy to associate with a database object in database 120, the policy specifying a custom function, defined by a user of the database, for triggering an archiving action on a stored representation of the database object. Database server instance 110 also registers the custom function in response to receiving a user input from the user requesting to register the custom function. A detailed description of this registration is described below under the Custom Function Registration heading. As discussed above, the custom policy may be specified as part of an ILM policy clause in a database command, which may be received from a database client user or application. A detailed breakdown of a syntax for the ILM policy clause is shown in FIG. 1B.

Figure 1B:
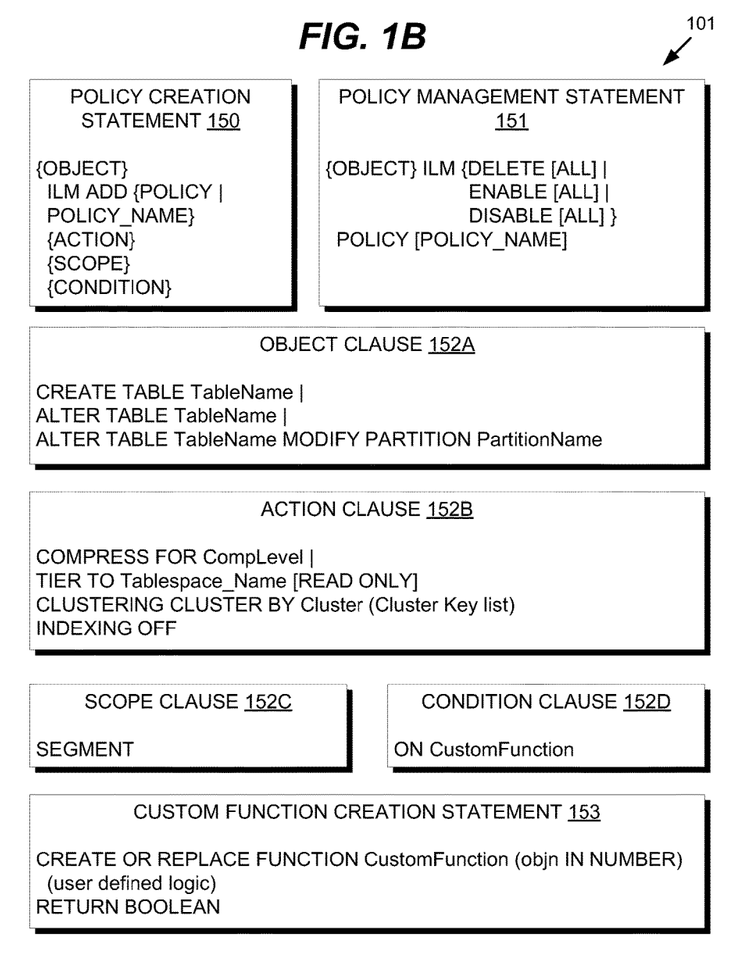
FIG. 1B is a block diagram that depicts an example declarative statement syntax to define custom policies for data movement and information lifecycle management in a database management system, according to an embodiment.

FIG. 1B is a block diagram that depicts an example declarative statement syntax to define custom policies for data movement and information lifecycle management in a database management system, according to an embodiment. Diagram 101 of FIG. 1B includes policy creation statement 150, policy management statement 151, object clause 152A, action clause 152B, scope clause 152C, condition clause 152D, and custom function creation statement 153.

Policy creation statement 150 shows the various component clauses for a database statement that creates an ILM policy. First is the {OBJECT} clause, which creates or modifies a database object. Next is the keyword "ILM ADD", which indicates that a new ILM policy is being defined for the database object created or modified in {OBJECT}. After the "ILM ADD" keyword, a friendly [POLICY_NAME] may be given to the ILM policy; otherwise, a schema-unique policy name may be generated automatically by using the POLICY keyword. After the policy name are various components specifying the details of the ILM policy: {ACTION} for the archiving action to execute on the database object, {SCOPE} for the scope, and {CONDITION} for the custom function before the archiving action is triggered.

Policy Object Clause

As discussed above, the {OBJECT} clause creates or modifies a database object. Thus, examples are shown in object clause 152A to create a table, to modify a table, and to modify a table partition.

Policy Action Clause

The {ACTION} clause specifies the ILM archiving action to perform on the stored representation of the {OBJECT}. As discussed above, an archiving action places the data object into an appropriate storage tier for a lifecycle phase of the database object, where the storage tier may represent a type of storage medium and/or the technique used to compress or store the data on the storage medium. Action clause 152B shows four example archiving actions. The first example archiving action compresses to a target CompLevel, which may include OLTP, QUERY LOW, QUERY HIGH, ARCHIVE LOW, and ARCHIVE HIGH, in order of lowest to highest compression level. The OLTP level may optionally specify the "INPLACE" keyword to prevent rows from being moved and consolidated, thereby avoiding index rebuilding.

The second example archiving action, "TIER TO", causes data movement of the database object into a target storage container, such as a tablespace. Typically, this is used to move inactive data from a high cost tablespace to a lower cost tablespace, such as from tablespace 130A to tablespace 130B in FIG. 1A. Optionally, the [READ ONLY] keyword may be specified to mark the target tablespace as read-only after moving the database object, which may help to accelerate backup operations.

The third example archiving action clusters a table on a specified cluster and cluster keys. By clustering a table, data that is accessed together can be spatially colocated to improve performance.

The fourth example archiving action disables indexing for a particular database object. When the database object is a table that is split into table partitions, then this action can be used to implement partial indexing, reducing the size and depth of the global index.

Other archiving actions may also be specified that are not specifically listed in action clause 152B. For example, a "move" archiving action may be specified to rebuild and re-sort a database object such as an index-sorted table.

Policy Scope Clause

The {SCOPE} clause specifies the scope with respect to the database object. As shown in scope clause 152C, the scope is set to SEGMENT, which refers to the segment that contains the database object, for example the segment of a table or a table partition.

Policy Condition Clause

The {CONDITION} clause specifies a pre-condition before the specified {ACTION} is triggered out on the {OBJECT}. More specifically, the {CONDITION} clause refers to the specific CustomFunction that should be called with the {OBJECT}. The CustomFunction may be a Boolean function that returns a TRUE or FALSE value. If a TRUE is returned, then the condition is satisfied and the {ACTION} is triggered.

Custom Function Registration

Since the CustomFunction must exist for the policy to operate, the user may provide user input in the form of database commands, similar to custom function creation statement 153, to define and request registration of one or more user-defined custom functions into database 120. As shown, each registration statement defines a name of the custom function ("CustomFunction"), one or more input arguments ("objn IN NUMBER"), a return type ("RETURN BOOLEAN"), and an implementation or code to carry out the user defined logic. In response, database management system 100 may add or update metadata in user procedures table 148, which may be specifically reserved for storing user-defined procedures, functions, and packages. After database server instance 110 starts, procedural extensions 112 may retrieve the stored custom functions 113 from user procedures table 148 to service any custom function calls from background policy evaluator 116.

As shown in custom function creation statement 153, "objn IN NUMBER" defines an input parameter, which may correspond to an object number for the associated database object. In other embodiments, a pointer may be passed instead of an object number. Within the body of the function, any user-defined custom logic can be implemented, which may access internal and external data sources, as discussed above. A final result is returned as a BOOLEAN TRUE or FALSE value, where TRUE indicates that the {ACTION} of the policy should be carried out on the database object.

While the implementation code for custom functions 113 may be stored as part of user procedures table 148, some portion of the implementation code may be external to database 120. For example, external C or Java executable files or dynamic link libraries may be called from a location outside of database 120, such as business logic server 172. In this case, user procedures table 148 may only store calls to the external functions in lieu of the actual implementation code.

Policy Association

Once a policy is received according to the syntax shown in policy creation statement 150, database server instance 110 may parse the policy and record the parsed policy into ILM policy table 142. Additionally, the policy may be associated with the database object {OBJECT} as well as all child database objects according to policy inheritance. These associations may be recorded in policy to object association table 144.

To prevent users from exceeding their permission levels, database server instance 110 may confirm that the user who created the custom function in the {CONDITION} clause has an ownership of the {OBJECT} before associating the policy, and task scheduler 115 may limit the execution privileges of any tasks generated from the policy to the same permissions of the user.

ILM Policy Management

After a policy is created for a database object, the policy may be enabled, disabled, or deleted for the database object by using the syntax shown in policy management statement 151. Additionally, ILM package 114 may be utilized to provide advanced policy management features. For example, policies may be assigned to execute at specific priority levels, which may affect the scheduling decisions of task scheduler 115. Additionally, a maximum number of concurrent task job executions may be configured, and resource utilization levels may be specified for all ILM tasks in general and/or for specific ILM task jobs. Policies may also be forced to execute their archiving actions regardless of whether their conditions are met.

Additionally, policies may be set to evaluate according to a specified schedule. By default, background policy evaluator 116 may evaluate all policies in ILM policy table 142 according to a periodic time interval, for example every 15 minutes or by another interval calibrated by a database administrator. However, this interval may be too frequent for certain policies that require a long time to evaluate their conditions. In this case, policies may be set to evaluate during a scheduled maintenance window or according to a customized schedule, rather than the default periodic time interval of 15 minutes. Thus, the user or database administrator who creates a policy may further specify a customized schedule specific for the policy. In this manner, the evaluation of the custom functions may be grouped according to different schedules, for example every 15 minutes, daily, weekly, and during maintenance windows.

Example ILM Use Case

To provide an example of recorded ILM policies using the syntax discussed above, FIG. 1C is a block diagram that depicts example custom policies for data movement and information lifecycle management in a database management system, according to an embodiment. Diagram 102 of FIG. 1C includes data dictionary 140 and custom functions 113. Data dictionary 140 includes ILM policy table 142. ILM policy table 142 includes policy 143A and policy 143B. With respect to FIG. 1C, like numbered elements may correspond to the same elements from FIG. 1A.

Table Partition Compression Policy

Figure 1C:
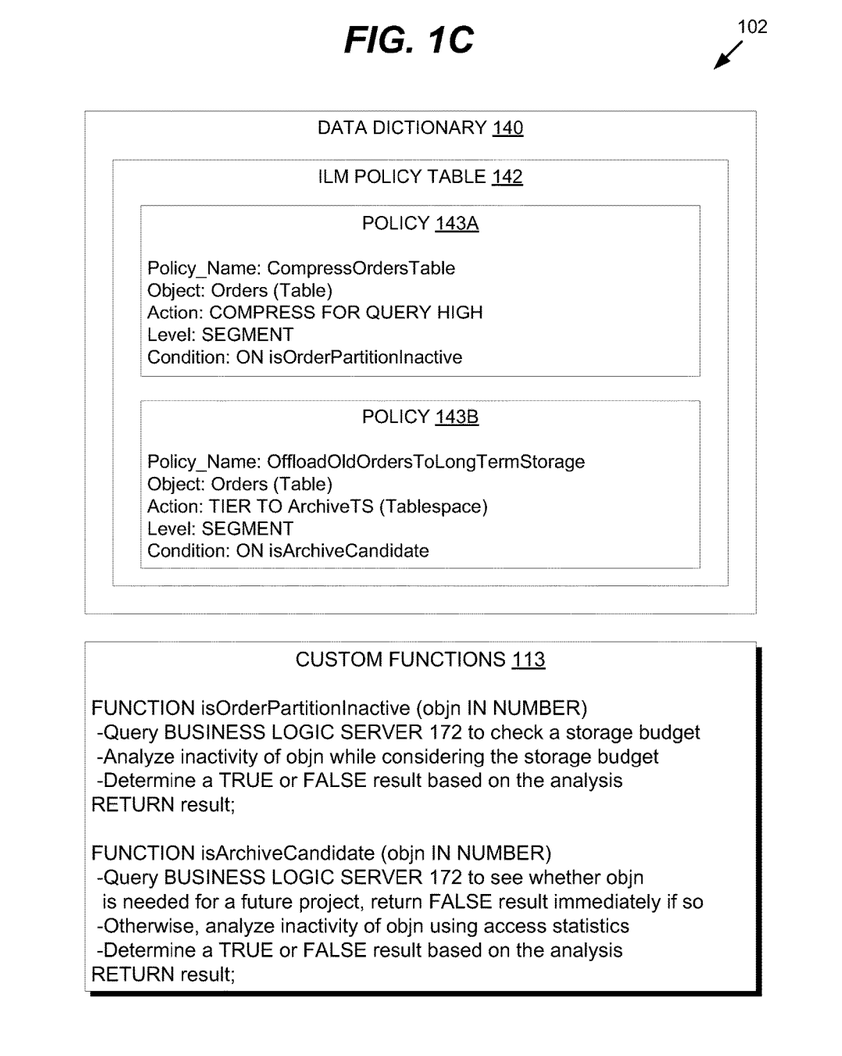
FIG. 1C is a block diagram that depicts example custom policies for data movement and information lifecycle management in a database management system, according to an embodiment.

ILM policy table 142 contains several policies that demonstrate an example ILM use case for database 120. New, uncompressed data may initially belong to a high relevance lifecycle stage. When table partitions of the Orders table are inactive, as determined by the custom function "isOrderPartitionInactive", then the table partitions are compressed to a higher QUERY HIGH level of compression, as reflected in policy 143A, to reflect a medium relevance lifecycle stage. For example, the Orders table may be partitioned by year of order, with Orders_2012 representing all orders for the year 2012. Since policy 143A is specified on the Orders table, all table partitions of the Orders table also inherit policy 143A. Accordingly, if any of the table partitions of the Orders table are TRUE according to "isOrderPartitionInactive", then the table partition may be compressed to the QUERY HIGH level.

Referring to custom functions 113, example pseudo code is indicated for the "isOrderPartitionInactive" custom function. In this example, a corporate client may lease access to database 120, being billed according to the allocated size of tablespace 130A. In this case, the corporate client may want to specify, by their own business rules and logic, how aggressively to compress data within tablespace 130A, or more specifically on the Orders table partitions.

Since a financial situation for the corporate client may change over time, business logic server 172 is first queried to retrieve a most recent storage budget. If the storage budget is relatively generous, then data may be preferred to be kept in an uncompressed state for higher performance. However, if the storage budget is relatively tight, then data may be preferred to be compressed to minimize storage footprint. With this in mind, the access statistics for the table partition can be analyzed for inactivity, weighted by considerations of the storage budget, and a decision can be made whether compression should be carried out (returning TRUE) or not carried out (returning FALSE). As discussed previously, the access statistics may be based on a block level, segment level, or higher level heatmap of database 120, which may be accessible via ILM package 114 or another interface.

Storage Tiering Policy

If the table partitions of the Orders table are inactive for an extended time period, then the table partitions may be offloaded to low cost storage in the ArchiveTS tablespace, as reflected in policy 143B, to reflect a low relevance lifecycle phase. Thus, once the "isArchiveCandidate" custom function returns a TRUE value for a specific table partition of the Orders table, then the table partition is moved to the ArchiveTS tablespace. Otherwise, the table partition remains in the CompanyTS tablespace.

Referring to custom functions 113, example pseudo code is indicated for the "isArchiveCandidate" custom function. First, business logic server 172 is queried to see whether the table partition may be needed for a future project. For example, the company may decide to run a promotion in the future, where order data from prior years needs to be analyzed for customer targeting. In this case, custom logic at business logic server 172 may dictate that data within a specific time frame, such as 5 years, should be kept in the active tablespace and not archived. Thus, if the table partition is for orders within those 5 years, a FALSE is immediately returned and the function ends. If business logic server 172 does not immediately end the function, then the processing may proceed to analyze access statistics for the table partition, similar to the process described above for the "isOrderPartitionInactive" function. Access statistics indicating substantial modification activity may tend towards a FALSE result, whereas access statistics indicating a long period of inactivity may tend towards a TRUE result.

Policy Evaluation

Having established an example set of recorded custom ILM policies, process 200 may continue by using policy 143A as corresponding to the specific policy that was received in block 202. Accordingly, at block 204 of process 200, referring to FIG. 1A, database server instance 110 evaluates policy 143A to determine that the condition is satisfied for the database object, or table 132 (Orders). Policy to object association table 144 may be used to identify the child objects of table 132 that inherited policy 143A, such as table partition 133 (Orders_2012).

Background policy evaluator 116 initiates an evaluation of policy 143A with respect to table partition 133 (Orders_2012). As previously discussed, evaluation may occur at a default periodic interval or 15 minutes or by a custom schedule. To evaluate policy 143A, a custom function "isOrderPartitionInactive" within custom functions 113 of FIG. 1C is called, with the object number of table partition 133 passed as an input argument. Evaluating of the custom function may proceed as described above, and a TRUE result may be returned.

Task Queuing

At block 206 of process 200, referring to FIG. 1A, in response to the evaluating of the custom function to a TRUE result, database server instance 110 performs the archiving action on table partition 133. In some embodiments, the archiving action may be immediately performed. In other embodiments, the archiving action may be queued for deferred execution according to available resources. For example, database server instance 110 may queue a task for executing the archiving action on table partition 133, wherein the queuing is in response to the evaluating of block 204. Since block 204 discovered that table partition 133 satisfied the condition of policy 143A, a task may be queued in ILM task table 146, indicating policy 143A, or the "CompressOrdersTable" policy, to be executed on table partition 133.

The task may be initially set to an "Inactive" state, awaiting execution. Task scheduler 115 may automatically retrieve and delegate the task from the queue in ILM task table 146. However, in some instances, a database administrator may wish to view the queue of tasks and manually approve tasks before allowing execution. In this case, task scheduler 115 may only process queued tasks in ILM task table 146 that are approved by the user.

Task Execution

After the task is queued, database server instance 110 proceeds to perform the ILM task. For example, task scheduler 115 may process a task queue in ILM task table 146 to delegate the ILM task to a specific database instance, for example as part of ILM active tasks 118 of database server instance 110. The status of the ILM task may thus be updated to "Active".

After database server instance 110 executes the compression action specified in the ILM task, table partition 133 may be compressed to the QUERY HIGH compression level. Indexes may also be rebuilt, if necessary. After compression, it may be possible that all four rows 136A-136D fit in one compressed database block 134A, in which case database block 134B may be freed for other data. The status of the ILM task may be updated to "Completed", and the ILM task may be removed from ILM active tasks 118.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
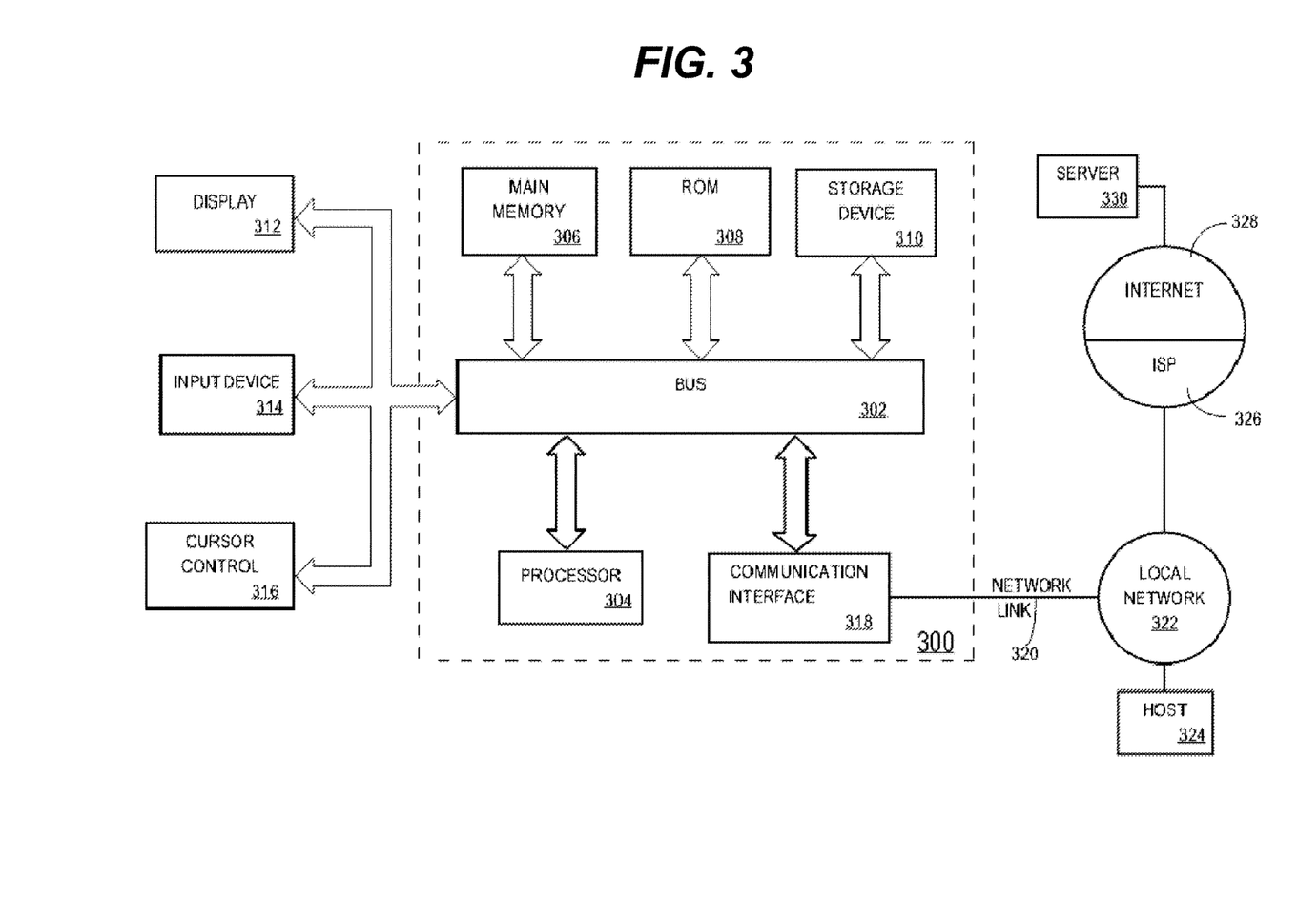
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
at a database management system, receiving user input from a user of a database requesting to register a custom function defined by the user, wherein the user input defines the custom function and one or more arguments for the custom function;
the database management system, in response to receiving the request to register the custom function, registering the custom function in a database managed by the database management system;
the database management system receiving a policy to associate with a database table stored in the database, said database table comprising a plurality of database objects, the policy specifying an archiving action on a stored representation of the database table and the custom function which, when evaluated to a particular result, triggers the archiving action;
in response to receiving the policy to associate with the database table:
confirming that the user has an ownership of the database table, and
storing the policy in the database;
the database management system automatically evaluating the custom function;
in response to evaluating the custom function to the particular result, the database management system performing the archiving action on a stored representation of one or more database objects, wherein performing the archiving action is limited based on permissions of the user, and wherein said one or more database objects are a portion of the plurality of database objects; and
wherein the method is performed by one or more computing devices.

2. The method of claim 1, wherein the custom function is a procedural function.

3. The method of claim 1, wherein the custom function utilizes an information resource external to the database.

4. The method of claim 1, wherein a portion of implementation code for the custom function is external to the database.

5. The method of claim 1, wherein the custom function utilizes access statistics associated with the plurality of database objects.

6. The method of claim 5, wherein the access statistics associated with the plurality of database objects include at least one of: an elapse of a minimum period of write inactivity, an elapse of a minimum period of read inactivity, and an elapse of a length of time since a creation time.

7. The method of claim 5, wherein the access statistics associated with the plurality of database objects include a segment level or block level heatmap of the database.

8. The method of claim 5, wherein the custom function utilizes one or more functions of an application programming interface (API) to retrieve the access statistics associated with the plurality of database objects prior to utilizing the access statistics.

9. The method of claim 1, wherein the policy is specified by a declarative statement of a database language, and receiving the policy includes receiving the declarative statement.

10. The method of claim 1, wherein the evaluating occurs on a periodic schedule.

11. The method of claim 10, wherein the evaluating occurs on a customized schedule specific to the policy.

12. The method of claim 1, wherein the performing of the archiving action utilizes a resource aware task scheduler of the database.

13. The method of claim 1, wherein the archiving action comprises moving the stored representation of the one or more database objects to a target storage structure.

14. The method of claim 1, wherein the archiving action comprises compressing the stored representation of the one or more database objects to a target compression level.

15. The method of claim 1, wherein the receiving of the policy is by inheriting the policy from a parent policy on a parent object of the database table.

16. A non-transitory computer-readable medium storing one or more sequences of instructions which, when executed by one or more processors, cause performing of:
at a database management system, receiving user input from a user of a database requesting to register a custom function defined by the user, wherein the user input defines the custom function and one or more arguments for the custom function;
the database management system, in response to receiving the request to register the custom function, registering the custom function in a database managed by the database management system;
the database management system receiving a policy to associate with a database table stored in the database, said database table comprising a plurality of database objects, the policy specifying an archiving action on a stored representation of the database table and the custom function which, when evaluated to a particular result, triggers the archiving action;
in response to receiving the policy to associate with the database table:
confirming that the user has an ownership of the database table, and
storing the policy in the database;
the database management system automatically evaluating the custom function;
in response to evaluating the custom function to the particular result, the database management system performing the archiving action on a stored representation of one or more database objects, wherein performing the archiving action is limited based on permissions of the user, and wherein said one or more database objects are a portion of the plurality of database objects.

17. The non-transitory computer-readable medium of claim 16, wherein the custom function utilizes access statistics associated with the one or more database objects.

18. A database management system comprising one or more computing devices configured to:
receive user input from a user of a database requesting to register a custom function defined by the user, wherein the user input defines the custom function and one or more arguments for the custom function;
in response to receiving the request to register the custom function, register the custom function in a database managed by the database management system;
receive a policy to associate with a database table stored in the database, said database table comprising a plurality of database objects, the policy specifying an archiving action on a stored representation of the database table and the custom function which, when evaluated to a particular result, triggers the archiving action;

in response to receiving the policy to associate with the database table:

confirm that the user has an ownership of the database table, and store the policy in the database;

automatically evaluate the custom function;

in response to evaluating the custom function to the particular result, perform the archiving action on a stored representation of one or more database objects, wherein performing the archiving action is limited based on permissions of the user, and wherein said one or more database objects are a portion of the plurality of database objects.

19. The database management system of claim 18, wherein the custom function utilizes access statistics associated with the one or more database objects.

\* \* \* \* \*

UNITED STATES PATENT AND TRADEMARK OFFICE
CERTIFICATE OF CORRECTION

PATENT NO. : 10,318,493 B2
APPLICATION NO. : 13/804581
DATED : June 11, 2019
INVENTOR(S) : Marwah et al.

Page 1 of 1

It is certified that error appears in the above-identified patent and that said Letters Patent is hereby corrected as shown below:

In the Specification

In Column 1, Line 15, delete "15," and insert -- 14, --, therefor.

Signed and Sealed this
Twenty-first Day of July, 2020

Andrei Iancu
*Director of the United States Patent and Trademark Office*